(12) United States Patent
Chen

(10) Patent No.: US 6,336,589 B1
(45) Date of Patent: Jan. 8, 2002

(54) DATA STORAGE MEDIUM AND APPARATUS FOR READING A DATA STORAGE MEDIUM

(76) Inventor: I-Ming Chen, No. 60, Lane 328, Li-Shan St., Nei-Hu Dist., Taipei City (TW)

( * ) Notice: Subject to any disclaimer, the term of this patent is extended or adjusted under 35 U.S.C. 154(b) by 0 days.

(21) Appl. No.: 09/453,915

(22) Filed: Apr. 26, 2000

(30) Foreign Application Priority Data

Jan. 29, 2000 (TW) ..................................... 89201630 U

(51) Int. Cl.$^7$ .............................................. G06K 13/00
(52) U.S. Cl. ...................... 235/475; 235/449; 235/479
(58) Field of Search ................................ 235/475, 479, 235/441, 449, 483, 454

(56) References Cited

U.S. PATENT DOCUMENTS

| | | | | |
|---|---|---|---|---|
| 4,734,794 A | * | 3/1988 | Mehnert et al. | 235/447 |
| 4,800,258 A | * | 1/1989 | Suzuki et al. | 235/479 |
| 4,926,032 A | * | 5/1990 | Shimamura et al. | 235/441 |
| 5,008,552 A | * | 4/1991 | Kuramochi et al. | 235/483 |
| 5,099,111 A | * | 3/1992 | Takakura et al. | 235/475 |
| 5,146,069 A | * | 9/1992 | Orimoto et al. | 235/475 |
| 5,150,352 A | * | 9/1992 | Kurihara | 235/475 |
| 5,563,397 A | * | 10/1996 | Fujimoto et al. | 235/441 |
| 5,814,805 A | * | 9/1998 | Reichardt et al. | 235/479 |
| 6,097,692 A | * | 8/2000 | Suzuki | 235/479 |
| 6,130,874 A | * | 10/2000 | Saito | 235/454 |

FOREIGN PATENT DOCUMENTS

JP  2001-6248  * 1/2001

* cited by examiner

Primary Examiner—Michael G. Lee
Assistant Examiner—Seung Ho Lee
(74) Attorney, Agent, or Firm—Finnegan, Henderson, Farabow, Garrett & Dunner, L.L.P.

(57) ABSTRACT

An apparatus is adapted for reading optically detected information stored in a data storage medium. The data storage medium is formed as a rectangular card body, at least one surface of which is provided with a data storage track having a plurality of parallel and equally spaced apart track sections stored with the optically detected information. The apparatus includes a first moving unit, associated operably with a carrier unit that has the data storage medium loaded thereon, for moving the carrier unit back and forth between first and second limit positions along a first axis parallel to the track sections, an optical detector unit for reading the optically detected information stored in one of the track sections when the carrier unit is moved by the first moving unit, a second moving unit, for moving the optical detector unit along a second axis transverse to the first axis, and a controller unit coupled to the first and second moving units and the optical detector unit. The controller unit receives the optically detected information read by the optical detector unit, and activates the second moving unit to move the optical detector unit upon detection that the carrier unit has been moved from one of the limit positions to the other one of the limit positions.

5 Claims, 10 Drawing Sheets

DATA STORAGE MEDIUM AND APPARATUS FOR READING A DATA STORAGE MEDIUM

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION

1. Description of the Related Art

It is known in the art to use an optical disk for the storage of software, music and film. However, the conventional optical disk has a relatively large size, and is thus inconvenient to handle.

2. Field of the Invention

The invention relates to a data storage medium and to an apparatus for reading the data storage medium, more particularly to a portable data storage medium that has a relatively large memory capacity, and to an apparatus for reading the data storage medium.

SUMMARY OF THE INVENTION

Therefore, the main object of the present invention is to provide a portable data storage medium having a relatively large storage capacity.

Another object of the present invention is to provide an apparatus for reading the data storage medium of this invention.

According to one aspect of the present invention, a data storage medium is adapted for storing optically detected information. The data storage medium includes a rectangular card body having first and second surfaces, at least one of which is formed with a data storage track having a plurality of parallel and equally spaced apart track sections that are adapted to be stored with the optically detected information.

According to another aspect of the present invention, an apparatus is adapted for reading optically detected information stored in a data storage medium. The data storage medium includes a rectangular card body having first and second surfaces, at least one of which is formed with a data storage track having a plurality of parallel and equally spaced apart track sections stored with the optically detected information. The apparatus includes a carrier unit, first moving means, optical detector means, second moving means and controller means.

The carrier unit is adapted to be loaded with the data storage medium thereon.

The first moving means, which is associated operably with the carrier unit, moves the carrier unit back and forth between first and second limit positions along a first axis parallel to the track sections.

The optical detector means is adapted for reading the optically detected information stored in one of the track sections when the carrier unit is moved by the first moving means along the first axis.

The second moving means, which is associated operably with the optical detector means, moves the optical detector means along a second axis transverse to the first axis.

The controller means is coupled electrically to the first and second moving means and the optical detector means. The controller means receives the optically detected information read by the optical detector means, and activates the second moving means to move the optical detector means by a predetermined distance along the second axis upon detection that the first moving means has moved the carrier unit from one of the first and second limit positions to the other one of the first and second limit positions.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
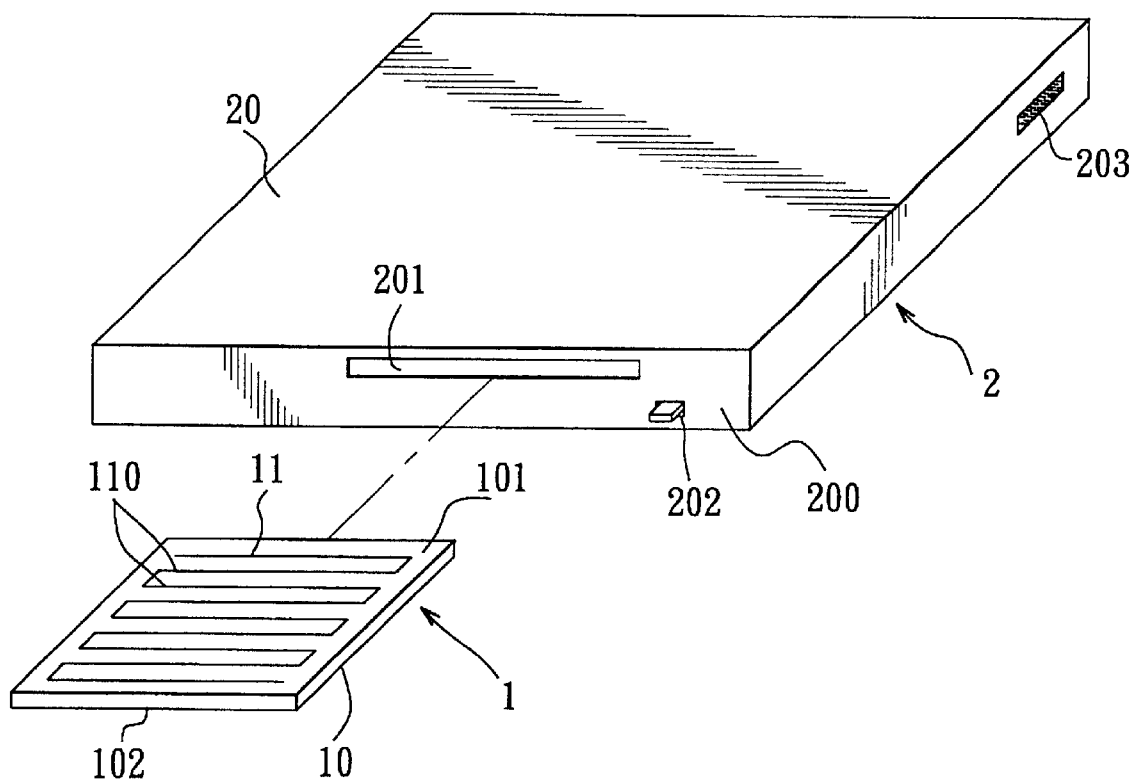
FIG. 1 is perspective view showing the preferred embodiment of a data storage medium and apparatus for reading the data storage medium according to this invention.

Referring to FIG. 1, according to the preferred embodiment of the present invention, a data storage medium 1 and an apparatus 2 for reading the data storage medium 1 are shown. The data storage medium 1 is adapted for storing optically detected information, and includes a rectangular card body 10 having first and second surfaces 101, 102. The first surface 101 is formed with a data storage track 11 having a plurality of parallel and equally spaced apart track sections 110 that are adapted to be stored with the optically detected information. The second surface 102 is printed with character and/or picture data (not shown). Alternatively, both the first and second surfaces 101, 102 may be formed with the data storage track 11; In this embodiment, each of the track sections 110 is connected to the adjacent track section 110 to form a continuous data storage track 11. As to how the optically detected information is stored in the data storage track 11, this is known in the art and will not be detailed herein for the sake of brevity.

Figure 2:
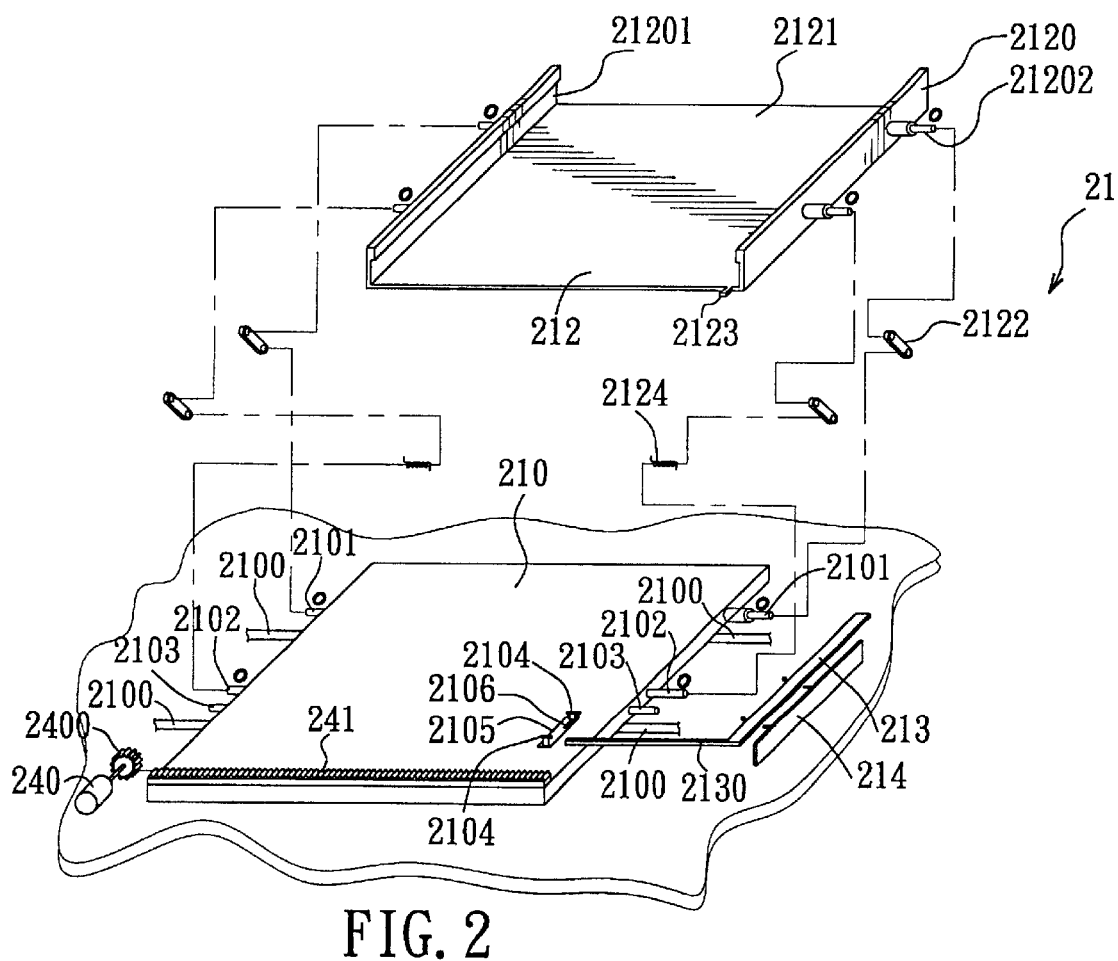
FIG. 2 is an exploded perspective view showing a carrier unit of the apparatus of the preferred embodiment.
Figure 3:
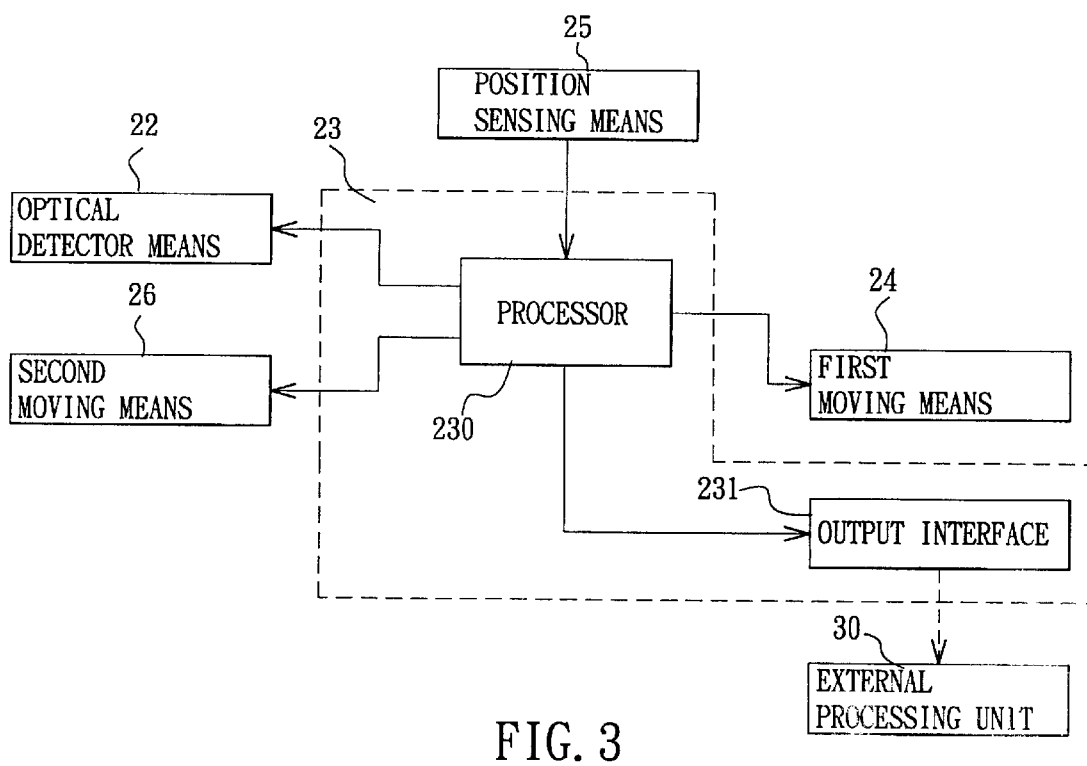
FIG. 3 is a schematic circuit block diagram of the apparatus of the preferred embodiment.
Figure 4:
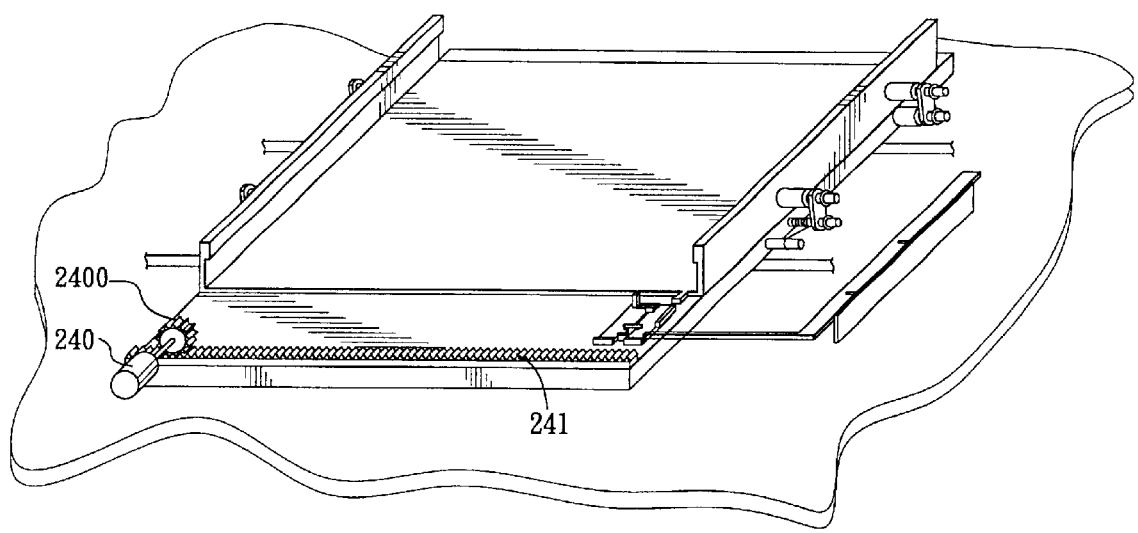
FIG. 4 is a fragmentary perspective view showing the carrier unit and first moving means of the apparatus of the preferred embodiment.

Referring to FIGS. 1 to 3, the apparatus 2 is shown to include a casing 20, a carrier unit 21, first moving means 24, optical detector means 22, position sensing means 25, second moving means 26, and controller means 23.

The casing 20 houses the carrier unit 21, the first moving means 24, the optical detector means 22, the position sensing means 25, the second moving means 26, and the controller means 23 therein. As shown in FIG. 1, the casing 20 includes a front wall 200 formed with an insert slot 201 for inserting the data storage medium 1 into the casing 20 and an operating hole 202 disposed below the insert hole 201, and a lateral wall formed with a connector 203 adapted to be connected to an external processing unit 30, as shown in FIG. 3. The casing 20 further includes a guide rail unit having a pair of guide rail rods 2100 that are disposed therein and that extend along a first axis parallel to the track sections 110, as shown in FIG. 2.

As shown in FIG. 2, the carrier unit 21 is adapted to be loaded with the data storage medium 1 thereon, and includes a base frame 210 and a carrier frame 212.

Figure 2A:
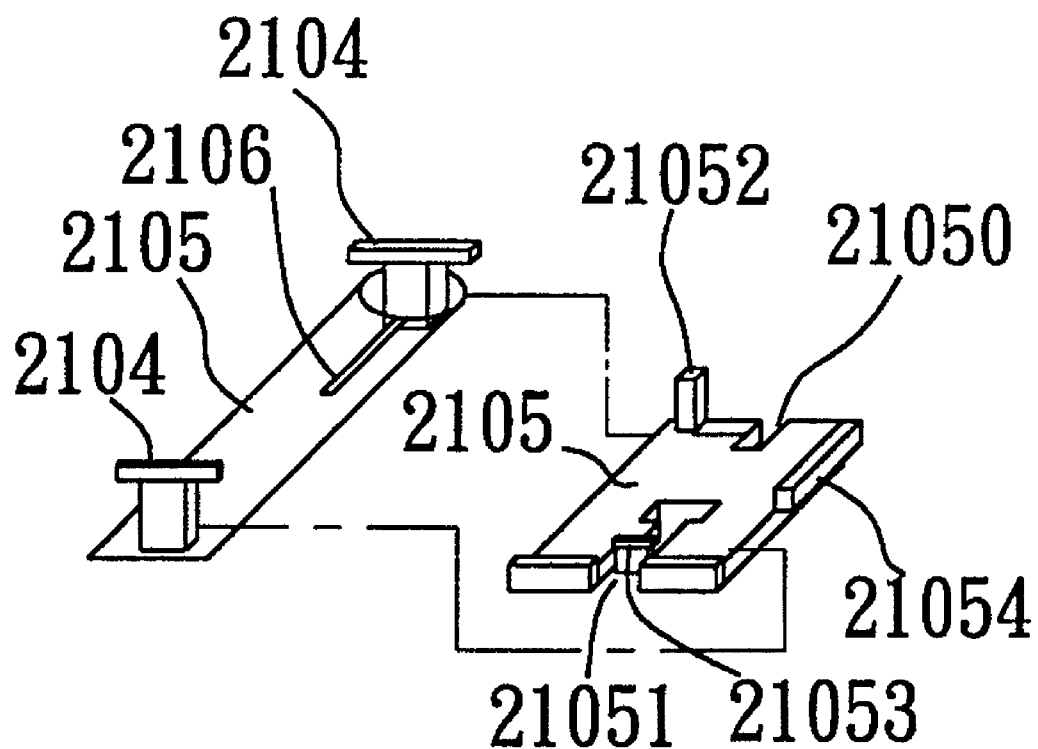
FIG. 2A is an exploded perspective view showing an encircled portion of FIG. 2.
Figure 5:
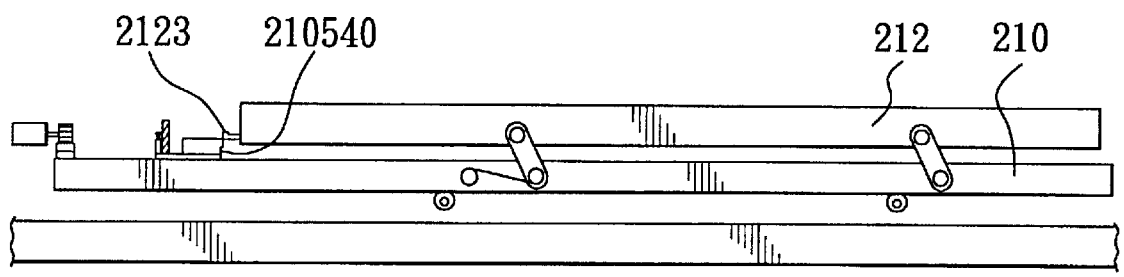
FIGS. 5 to 7 are schematic fragmentary side views showing how a carrier frame of the carrier unit moves from an unloaded position to a loaded position.

The base frame 210 is slidably disposed on and is movable along the guide rail unit. The base frame 210 has opposite lateral sides, each of which is formed with horizontally extending first and second connecting posts 2101, 2102, and a horizontally extending fixing post 2103 adjacent to the second connecting post 2102, and a top side formed with aligned front and rear vertical guiding posts 2104 adjacent to a rear end thereof. An engaging piece 2105, as shown in FIG. 2A, has a front end formed with a rearwardly extending first groove 21050 and an upwardly extending stop post 21052, and a rear end formed with a forwardly extending second groove 21051 and an upwardly extending engaging post 21053. The first and second grooves 21050, 21051 engage the guiding posts 2104. The engaging post 21053 is aligned with the guiding posts 2104, respectively. The engaging piece 2105 is thus movable forwardly and rearwardly on the base frame 210. A coil spring 2106 is connected between the engaging post 21053 of the engaging piece 2105 and one of the guiding posts 2104 closer to a front end of the base frame 210. The engaging piece 2105 is thus biased forwardly by the coil spring 2106. An abutting piece 21054 is disposed on a lateral side of the engaging piece 2105, and extends rearwardly from the front end of the engaging piece 2105. The abutting piece 21054 is formed with an indentation 210540, as shown in FIG. 5, adjacent to the front end of the engaging piece 2105.

Figure 6:
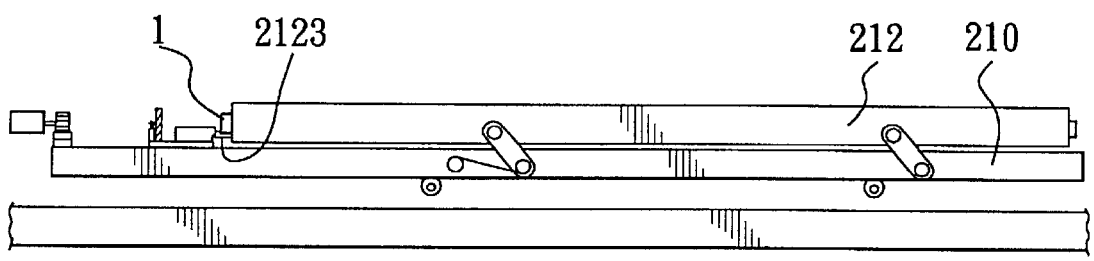
Figure 7:
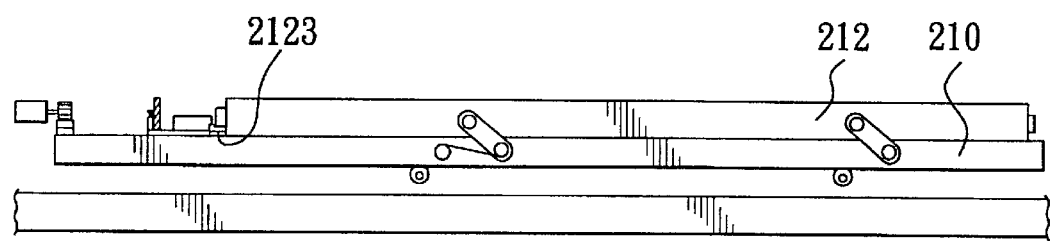

The carrier frame 212 is loaded with the data storage medium 1 thereon when the latter is inserted via the insert slot 201 in the casing 20. The carrier frame 212 is disposed above and is coupled pivotally on the base frame 211. The carrier frame 212 has a bottom wall 2121, and opposite side walls 2120 connected to the bottom wall 2121 and extending upwardly therefrom. Each of the side walls 2120 has an inner surface formed with a slide groove 21201 to receive a corresponding lateral edge of the data storage medium 1, and an outer surface formed with a pair of horizontally extending pivot posts 21202. A pivot piece 2122 is connected pivotally between each of the pivot posts 21202 of the carrier frame 212 and a respective one of the connecting posts 2101, 2102 of the base frame 210. As such, the carrier frame 212 is movable forwardly and upwardly relative to the base frame 210 to an unloaded position, where the data storage medium 1 can be loaded on and unloaded from the carrier frame 212 via the insert slot 201 in the casing 20, and is movable rearwardly and downwardly relative to the base frame 210 to a loaded position when the data storage medium 1 is loaded on the carrier frame 212 via the insert slot 201 in the casing 20. A lug piece 2123 extends rearwardly from a rear edge of the bottom wall 2121. When the carrier frame 212 is moved to the unloaded position, as shown in FIGS. 5 and 6, the lug piece 2123 of the carrier frame 212 contacts with a part of a front edge of the abutting piece 21054 of the engaging piece 2105 of the base frame 210. When the carrier frame 212 is moved to the loaded position, as shown in FIG. 7, the lug piece 2123 of the carrier frame 212 engages to the indentation 210540 in the abutting piece 21054. A torsion spring 2124 is provided between each of the second connecting posts 2102 of the base frame 210 and a respective one of the pivot posts 21202 of the carrier frame 212. The carrier frame 212 is thus biased by the torsion springs 2124 to the unloaded position.

An L-shaped operating rod 213 is slidably provided in the casing 20 on a mounting frame 214 that is disposed on an inner surface of the casing 20 adjacent to the base frame 210. The operating rod 213 has a first portion formed with a push end that extends outwardly of the casing 20 via the operating hole 202 (see FIG. 1), and a second portion 2130 transverse to the first portion and extending between the abutting piece 21054 and the engaging post 21053 such that the engaging piece 2105 is moved rearwardly when the push end is pushed inwardly to unload the data storage medium 1 from the carrier unit 21.

The first moving means 24, which is associated operably with the carrier unit 21, moves the carrier unit 21 back and forth between first and second limit positions along the first axis. As shown in FIG. 2, the first moving means 24 includes a rack 241 and a bi-directional motor 240. The rack 241 is mounted on a rear portion of the base frame 210, and extends along the first axis. The bi-directional motor 240 is mounted in the casing 20, and has a drive gear 2400 that meshes with the rack 241. As such, rotation of the drive gear 2400 results in sliding movement of the base frame 210 along the guide rail unit.

Figure 8:
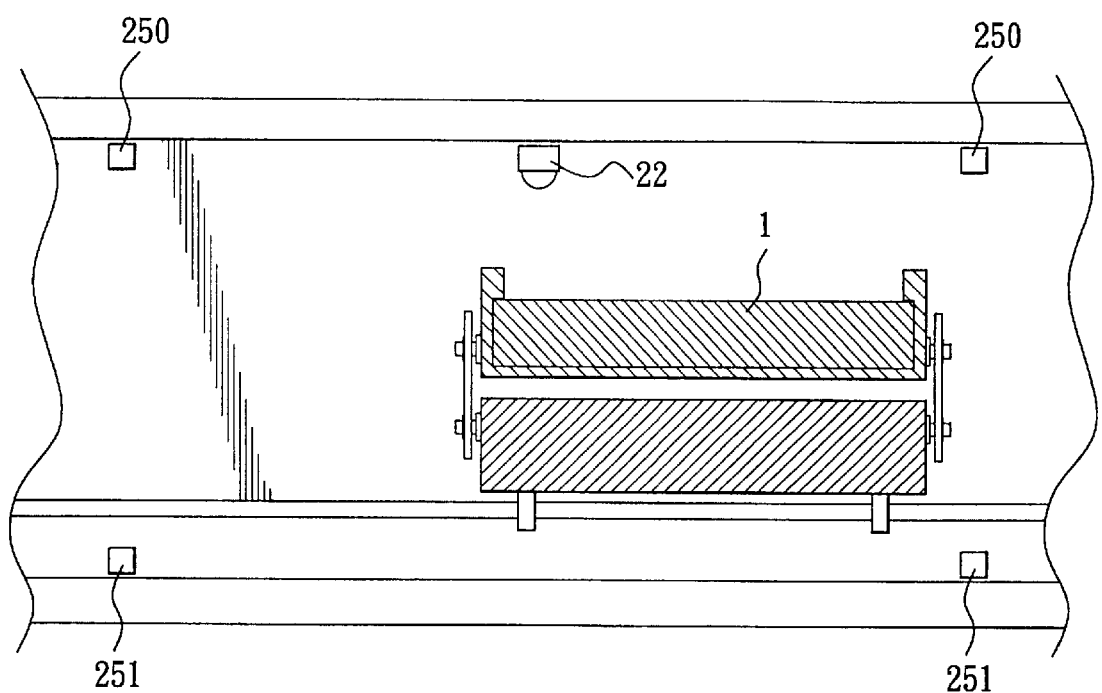
FIG. 8 is a schematic front view illustrating how movement of the carrier unit can be limited between first and second limit positions in accordance with the preferred embodiment.

As shown in FIG. 8, the optical detector means 22 is adapted to read the optically detected information stored in one of the track sections 110 of the data storage medium 1 when the carrier unit 21 is moved by the first moving means 24 along the first axis. As to how the optical detector means 22 reads the optically detected information, this is known in the art and will not be detailed herein for the sake of brevity.

Figure 9:
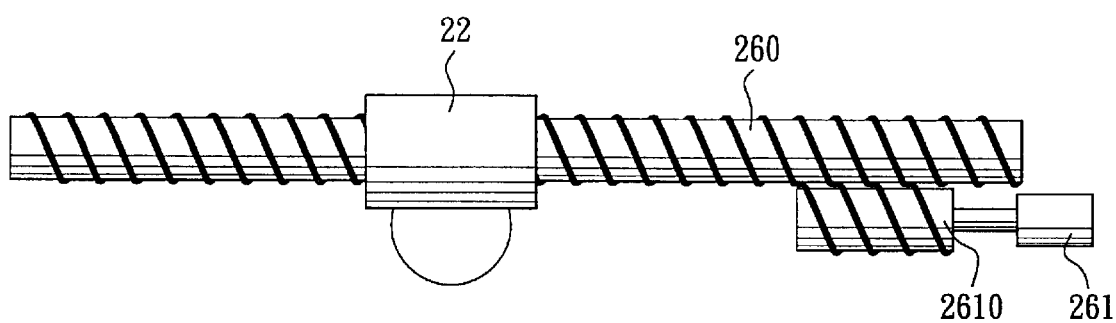
FIG. 9 is a schematic fragmentary side view showing second moving means of the apparatus of the preferred embodiment.

The second moving means 26, which is associated operably with the optical detector means 22, moves the optical detector means 22 along a second axis transverse to the first axis. As shown in FIG. 9, the second moving means 26 includes an externally threaded guide shaft 260 and a bi-directional motor 261. The guide shaft 260 is mounted rotatably in the casing 20, and extends along the second axis. The optical detector means 22 is supported on the guide shaft 260 such that axial rotation of the guide shaft 260 results in linear movement of the optical detector means 22 along the guide shaft 260. The bidirectional motor 261 is mounted in the casing 20, and has a drive gear 2610 that meshes with the guide shaft 260 such that rotation of the drive gear 2610 results in corresponding axial rotation of the guide shaft 260.

The position sensing means 25 includes two sets of an optical signal generator 250 and an optical signal receiver 251, which are mounted in the casing 20 at the first and second limit positions, respectively. Each of the optical signal generators 250 is spaced apart from the respective one of the optical signal receivers 251 so as to form an optical signal path therebetween. The optical signal generators 250 generate an optical signal that is received by the optical signal receivers 251 when the carrier unit 21 has yet to reach the first and second limit positions and that is interrupted by the carrier unit 21 when the carrier unit 21 is moved to one of the first and second limit positions.

As shown in FIG. 3, the controller means 23 is coupled electrically to the first and second moving means 24, 26, the optical detector means 22, and the position sensing means 25. The controller means 23 receives the optically detected information read by the optical detector means 22, activates the second moving means 26 to move the optical detector means 22 by a predetermined distance along the second axis upon detection that the first moving means 24 has moved the carrier unit 21 from one of the first and second limit positions to the other one of the first and second limit positions, and activates the first moving means 24 to move the carrier unit 21 in an opposite direction relative to an initial direction along the first axis upon detection that the optical signal generated by the optical signal generators 250 of the position sensing means 25 is interrupted by the carrier unit 21. The predetermined distance is equal to a distance between adjacent ones of the track sections 110 such that, when the second moving means 26 is activated by the controller means 23, the optical detector means 22 is moved away from an initial one of the track sections 110 and into alignment with another one of the track sections 110 adjacent to the initial one of the track sections 1 10. The controller means 23 includes a processor 230 and an output interface 231 coupled electrically to the processor 230. The processor 230 processes the optically detected information from the optical detector means 22 in a known manner, and provides the optically detected information to the external processing unit 30 via the output interface 231.

The first moving means 24 should not be limited to the arrangement of the preferred embodiment. It should be understood that a solenoid device may be employed instead of the motor 240 and the rack 241 to achieve the same function.

It is noted that the data storage medium 1 of this invention has a relatively small size and a relatively large storage capacity. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

Deposit of Computer Program Listings

Not Applicable

I claim:

1. An apparatus for reading optically detected information stored in a data storage medium, the data storage medium including a rectangular card body having first and second surfaces, at least one of which is formed with a data storage track having a plurality of parallel and equally spaced apart track sections stored with the optically detected information, said apparatus comprising:

a carrier unit adapted to be loaded with the data storage medium thereon;

first moving means, associated operably with said carrier unit, for moving said carrier unit back and forth between first and second limit positions along a first axis parallel to the track sections;

optical detector means adapted for reading the optically detected information stored in one of the track sections when said carrier unit is moved by said first moving means along the first axis;

second moving means, associated operably with said optical detector means, for moving said optical detector means along a second axis transverse to the first axis;

controller means coupled electrically to said first and second moving means and said optical detector means, said controller means receiving the optically detected information read by said optical detector means and activating said second moving means to move said optical detector means by a predetermined distance along the second axis upon detection that said first moving means has moved said carrier unit from one of the first and second limit positions to the other one of the first and second limit positions; and a casing for housing said carrier unit, said first moving means, said optical detector means, said second moving means and said controller means therein, said casing being formed with an insert slot adapted for inserting the data storage medium into said casing so as to permit loading of the data storage medium on said carrier unit, wherein said casing has a guide rail unit that is disposed therein and that extends along the first axis, said carrier unit including:

a base frame slidably disposed on and movable along said guide rail unit; and, a carrier frame adapted to be loaded with the data storage medium thereon, said carrier frame being disposed above and being coupled pivotally on said base frame, said carrier frame being movable forwardly and upwardly relative to said base frame to an unloaded position, where the data storage medium can be loaded on and unloaded from said carrier frame via said insert slot in said casing, and being movable rearwardly and downwardly relative to said base frame to a loaded position when the data storage medium is loaded on said carrier frame via said insert slot in said casing.

2. The apparatus of claim 1, wherein the predetermined distance is equal to a distance between adjacent ones of the track sections such that, when said second moving means is activated by said controller means, said optical detector means is moved away from an initial one of the track sections and into alignment with another one of the track sections adjacent to the initial one of the track sections.

3. The apparatus of claim 1, wherein said first moving means includes:

a rack that is mounted on said base frame and that extends along the first axis; and a bi-directional motor mounted in said casing and having a drive gear that meshes with said rack;

whereby, rotation of said drive gear results in sliding movement of said base frame along said guide rail unit.

4. The apparatus of claim 1, wherein said second moving means includes:

an externally threaded guide shaft that is mounted rotatably in said casing and that extends along the second axis, said optical detector means being supported on said guide shaft such that axial rotation of said guide shaft results in linear movement of said optical detector means along said guide shaft; and a bi-directional motor mounted in said casing and having a drive gear that meshes with said guide shaft such that rotation of said drive gear results in corresponding axial rotation of said guide shaft.

5. The apparatus of claim 1, wherein said controller means is adapted to process the optically detected information from said optical detector means and to provide the optically detected information to an external processing unit.

* * * * *